(12) United States Patent
Ito

(10) Patent No.: US 7,257,828 B2
(45) Date of Patent: Aug. 14, 2007

(54) OPTICAL HEAD DEVICE

(75) Inventor: Tatsuya Ito, Daito (JP)

(73) Assignee: Funai Electric Co., Ltd, Osaka (JP)

( * ) Notice: Subject to any disclaimer, the term of this patent is extended or adjusted under 35 U.S.C. 154(b) by 533 days.

(21) Appl. No.: 10/754,046

(22) Filed: Jan. 8, 2004

(65) Prior Publication Data

US 2004/0141452 A1 Jul. 22, 2004

(30) Foreign Application Priority Data

Jan. 9, 2003 (JP) .............................. 2003-003056

(51) Int. Cl.
*G11B 7/08* (2006.01)
(52) U.S. Cl. ..................................... 720/658
(58) Field of Classification Search ................ 720/658, 720/662; 369/112.01, 112.29, 112.15; 356/338; 385/16
See application file for complete search history.

(56) References Cited

U.S. PATENT DOCUMENTS

| | | | |
|---|---|---|---|
| 5,237,386 A * | 8/1993 | Harley | 356/338 |
| 6,052,357 A * | 4/2000 | Ogawa et al. | 720/662 |
| 6,212,151 B1 * | 4/2001 | Heanue et al. | 385/16 |
| 6,868,055 B2 * | 3/2005 | Ueyama et al. | 369/112.15 |
| 6,928,044 B2 * | 8/2005 | Tachikawa et al. | 369/112.29 |
| 7,038,994 B1 * | 5/2006 | Taniguchi et al. | 369/112.01 |

FOREIGN PATENT DOCUMENTS

| JP | 1-133221 | 9/1989 | |
|---|---|---|---|
| JP | 2-301028 | 12/1990 | |
| JP | 5-4114 | 1/1993 | |
| JP | 05181026 A * | 7/1993 | |
| JP | 06-124476 | 5/1994 | |
| JP | 06-203388 | 7/1994 | |
| JP | 08-146265 | 6/1996 | |
| JP | 2001-351264 | 12/2001 | |

OTHER PUBLICATIONS

Patent Abstracts of Japan, Publication No. 02-301028 dated Dec. 13, 1990, 1 pg.

(Continued)

*Primary Examiner*—Tianjie Chen
(74) *Attorney, Agent, or Firm*—Osha Liang LLP

(57) ABSTRACT

An optical head device includes a base member having an attachment surface passing a laser beam of light reflected by an optical disk, a block in the form of a wedge having an attachment surface adjacent to that of the base member and an attachment surface opposite that adjacent to the base member's attachment surface, and a photodetector arranged on the block's attachment surface opposite that adjacent to the base member's attachment surface to receive a laser beam of light having passed through the base member's attachment surface. The block's attachment surface opposite that adjacent to the base member's attachment surface inclines relative to the base member's attachment surface. The optical head device further includes adhesive fixing the block on the base member's attachment surface at a desired position and adhesive fixing the photodetector on the block's attachment surface opposite that adjacent to the base member's attachment surface at a desired position.

10 Claims, 3 Drawing Sheets

OTHER PUBLICATIONS

Japanese Office Action on Appl. No. 2003/003056 dated Feb. 1, 2005 citing references; (5 pages); both English and Japanese.
Patent Abstracts of Japan for Publication No. 06-203388; Dated Jul. 22, 1994; (1 page).
Patent Abstracts of Japan for Publication No. 2001-351264; Dated Dec. 21, 2001; (1 page).
Japan Patent Office Utility Model Laying-Open Gazette; No. 5-4114; Dated Jan. 22, 1993; for Application No. 3-49845; (2 pages).
Japan Patent Office Utility Model Laying-Open Gazette; No. 1-133221; Dated Sep. 11, 1989; for Application No. 63-21669; 2 pages.
Patent Abstracts of Japan; Publication No. 08-146265; Dated Jun. 7, 1996; (1 page).
Patent Abstracts of Japan; Publication No. 06-124476; Dated May 6, 1994; (1 page).

* cited by examiner

OPTICAL HEAD DEVICE

BACKGROUND OF THE INVENTION

1. Field of the Invention

The present invention relates generally to optical head devices and particularly to optical head devices having a structure positionally adjusting a photodetector.

2. Description of the Background Art

Optical head devices are used to read information written on compact discs (CDs), digital versatile discs (DVDs) and the like and record information on CDs, DVDs and the like.

For such an optical head device an optical source outputs a beam of light which is directed to a CD or a DVD to illuminate the disc. The disc reflects the light which is in turn directed toward a photodiode IC (PDIC). To allow the PDIC's photo-receptive portion to receive a focused beam of light at an appropriate position the PDIC needs to be moved to and fixed at an appropriate position. An optical head device contemplated to facilitate such a PDIC's positional adjustment is disclosed by Japanese Patent Laying-Open No. 2-301028 as an optical pickup device.

FIG. 5 is a perspective view of the optical pickup device disclosed in Japanese Patent Laying-Open No. 2-301028. With reference to the figure this optical pickup device includes an optical head base 104, a movable plate 103 arranged on optical head base 104, an adhesive 105 fixing movable plate 103 on optical head base 104, a metal plate 102 fixed to movable plate 103 integrally, and a photodetector 101 mounted on metal plate 102. Adhesive 105 is placed along a perimeter of movable plate 103 as well as between movable plate 103 and optical head base 104. In other words, by interposing adhesive 105, movable plate 103 is positioned afloat above optical head base 104.

The optical pickup device is fabricated as follows: movable plate 103 integral with metal plate 102 having photodetector 101 mounted thereon, and optical head base 104 are positioned. Movable plate 103 and optical head base 104 are positioned three dimensionally so that a beam of light is focused in the form of a spot of light on photodetector 101 at a light receptive portion. Movable plate 103 and optical head base 104 thus positioned have their relative, positional relationship maintained for example by a jig. Adhesive 105 is applied between movable plate 103 and optical head base 104 to fix them.

FIG. 6 is a cross section of another optical pickup device disclosed in Japanese Patent Laying-Open No. 3-301028. With reference to the figure, this optical pickup device includes an optical head base 204 having a main surface, a movable plate 203 arranged on the main surface, a metal plate 202 arranged on a top surface of movable plate 203, and a photodetector 201 arranged at metal plate 202. Movable plate 203 and metal plate 202 have their respective one ends screwed to optical head base 204 with a screw 207. Metal plate 202 has the other end with an adjustment screw 206 screwed therethrough. By tightening adjustment screw 206, metal plate 202 can be bent with the metal plate 202 one end serving as a supporting point.

In the FIG. 6 device, movable plate 203 is moved on optical head base 204 to positionally adjust photodetector 201 in a surface parallel to the main surface of optical head base 204. Furthermore, adjustment screw 206 tightened and loosened positionally adjust photodetector 201 in a direction perpendicular to the main surface of optical head base 204.

In the FIG. 5 device, photodetector 101 is positionally fixed by adhesive 105 posed between movable plate 103 and optical head base 104. However, adhesive 105 reduces in volume when it sets. As such, photodetector 101 once positionally adjusted to have a position at which a beam of light collects might be fixed offset from the position as adhesive 105 placed between movable plate 103 and optical head base 104 contracts. In general, photodetector 101 is positionally adjusted with a precision in steps of several micrometers, and if movable plate 103 is not chamfered, as described in Japanese Patent Laying-Open No. 2-301028, the effect of the contraction of adhesive 105 would still not be ignored.

Furthermore, adhesive 105 has a coefficient of linear expansion having a relatively large value. As such, even after adhesive 105 has set, photodetector 101 can be positionally offset if the optical pickup device is used in a thermally varying environment. Furthermore, it is difficult to use a jig or the like to maintain a relative, positional relationship between movable plate 103 and optical head base 104 while introducing adhesive 105 into a small gap between movable plate 103 and optical head base 104. The optical pickup device is thus fabricated inefficiently.

In the FIG. 6 device, photodetector 201 is fixed at a prescribed position and metal plate 202 is accordingly held bent. Accordingly, movable plate 202 is constantly under tension, which may cause movable plate 202 to creep. In particular, metal plate 202 is tensioned particularly intensively for example at a portion notched in the vicinity of one end to help metal plate 202 to bend and a portion at which adjustment screw 206 contacts metal plate 202. If such portions creep, metal plate 202 distorts. This distortion varies in amount with time, resulting in photodetector 201 having an offset position.

SUMMARY OF THE INVENTION

The present invention has been made to solve the disadvantage described above. It contemplates a highly reliable optical head device that can readily and precisely adjust the position of a photodetector and also prevent the photodetector once positionally adjusted from thereafter positionally being displaced.

The present invention in one aspect provides an optical head device including: a base member including a first attachment surface passing light reflected by an optical recording medium; a support member having a second attachment surface adjacent to the first attachment surface, and a third attachment surface opposite the second attachment surface; a guide member arranged on the first attachment surface; a first adhesive member fixing the support member on the first attachment surface at a desired position; a photodetector arranged on the third attachment surface to receive the light having passed through the first attachment surface; and a second adhesive member fixing the photodetector on the third attachment surface at a desired position. The third attachment surface has a first portion having a first distance to the first attachment surface and a second portion having a second distance to the first attachment surface, the second distance being greater than the first distance. The third attachment surface extends in a direction substantially perpendicular to a direction followed by the light having passed through the first attachment surface. The guide member has a guide surface extending along from the first portion toward the second portion.

In the optical head device thus configured the photodetector can be moved on the third attachment surface to have an optimum, adjusted position in a plane perpendicular to a direction followed by the light having passed through the first attachment surface and the support member can be moved on the first attachment surface to positionally adjust the photodetector to have an optimum position in a direction followed by the light having passed through the first attachment surface. Thus the photodetector's three dimensional, positional adjustment can be readily and precisely achieved and the optical head device can be fabricated rapidly. Furthermore as light passing through the first attachment surface can be incident perpendicularly on the third attachment surface to facilitate perpendicular incidence of light on the photodetector's light receptive portion.

Furthermore the optical head device includes first and second adhesive members. The first and second adhesive members do not limit the positions of the support member and photodetector fixed on the first and third attachment surfaces. The support member and the photodetector can be moved on the first and third attachment surfaces, as desired, and positioned at prescribed locations, respectively, and then fixed at the locations. Furthermore in accordance with the present invention as the support member and the photodetector can be moved on the first and third attachment surfaces to positionally adjust the photodetector there is not an adhesive member introduced between the support member and the first attachment surface or between the photodetector and the third attachment surface. The photodetector can be fixed at an appropriate position, free from an effect of contraction of an otherwise introduced adhesive member.

Furthermore the optical head device includes a guide member. The support member can be moved along the guide member's guide surface to positionally adjust the photodetector. Thus the photodetector's position can be further readily and precisely adjusted.

The present invention in another aspect provides an optical head device including: a base member having a first attachment surface passing light reflected by an optical recording medium; a support member having a second attachment surface adjacent to the first attachment surface, and a third attachment surface opposite the second attachment surface; and a photodetector arranged on the third attachment surface to receive the light having passed through the first attachment surface. The third attachment surface has a first portion having a first distance to the first attachment surface and a second portion having a second distance to the first attachment surface, the second distance being greater than the first distance. The support member is configured to allow the first and second distances to be substantially invariably maintained when the first and second portions receive a force exerted toward the second attachment surface.

In the optical head device thus configured the third attachment surface has first and second portions having different distances to the first attachment surface. By moving the photodetector on the third attachment surface or the support member on the first attachment surface, the photodetector can be moved to a position at which light having passed through the first attachment surface collects.

More specifically, if light reflected by an optical recording medium is incident perpendicularly on the first attachment surface, the photodetector is moved on the third attachment surface and thus positionally adjusted to have an optimum position in a direction followed by the light passing through the first attachment surface and the support member is moved on the first attachment surface to positionally adjust the photodetector to have an optimum position in a plane perpendicular to a direction followed by the light passing through the first attachment surface. If light reflected by an optical recording medium is incident perpendicularly on the third attachment surface, then the photodetector is moved on the third attachment surface to have an adjusted, optimum position in a plane perpendicular to a direction followed by the light passing through the first attachment surface and the support member is moved on the first attachment surface to positionally adjust the photodetector to have an optimum position in a direction followed by light passing through the first attachment surface.

Thus the support member inserted between the photodetector and the base member can facilitate the photodetector's precise, three dimensional, positional adjustment. Furthermore the optical head device can also be fabricated rapidly.

Furthermore the support member is sufficiently rigid to maintain the distance between the first and third attachment surfaces when it receives external force. This ensures that the photodetector having been positionally adjusted is held at the adjusted position. Thus a highly reliable optical head device can be implemented.

Still preferably the optical head device further includes a first adhesive member fixing the support member on the first attachment surface at a desired position and a second adhesive member fixing the photodetector on the third attachment surface at a desired position. In the optical head device thus configured the first and second adhesive members do not limit the positions of the support member and photodetector fixed on the first and third attachment surfaces. The support member and the photodetector can be moved on the first and third attachment surfaces, as desired, and positioned at prescribed locations, respectively, and then fixed at the locations. Furthermore in accordance with the present invention as the support member and the photodetector can be moved on the first and third attachment surfaces to positionally adjust the photodetector there is not an adhesive member introduced between the support member and the first attachment surface or between the photodetector and the third attachment surface. The photodetector can be fixed at an appropriate position, free from an effect of contraction of an otherwise introduced adhesive member.

Still preferably the first and second adhesive members are an ultra violet cure adhesive. The first and second adhesive members exposed to ultra violet ray set in a short period of time. This can prevent a positional displacement of the support member and photodetector that would otherwise be introduced before adhesive set. Furthermore, the optical head device can be fabricated rapidly.

Still preferably the third attachment surface extends in a direction substantially perpendicular to a direction followed by the light having passed through the first attachment surface. This allows light passing through the first attachment surface to be incident perpendicularly on the third attachment surface. This can facilitate perpendicular incidence of light on the photodetector's light receptive portion.

Still preferably the optical head device further includes a guide member arranged on the first attachment surface and having a guide surface extending in a direction along from the first portion toward the second portion. The support member can be moved along the guide member's guide surface to allow the photodetector to be positionally adjusted further readily and precisely.

Still preferably the third attachment surface inclines relative to the first attachment surface and forms an angle of no less than 5° and no more than 30° relative to the first attachment surface. The photodetector's position can be adjusted further readily and rapidly and the optical head device can also be miniaturized.

More specifically, when the first and third attachment surfaces form an angle smaller than 5°, the support member or the photodetector will be adjusted with an increased distance. Accordingly, the first attachment surface is required to have an area sufficiently larger than the second attachment surface adjacent to the first attachment surface. This increases in size the base member including the first attachment surface and the optical head device cannot be miniaturized. Furthermore, if the first and third attachment surfaces form an angle greater than 30°, then the support member or the photodetector would be adjusted with too small a distance. This entails a highly precise positioning operation to move the support member or the photodetector to positionally adjust the photodetector. The first and third attachment surfaces that form an angle of no less than 5° and no more than 30° can resolve such a problem and achieve the effect as described above.

Still preferably the support member is slid on the first attachment surface to positionally adjust the photodetector to have an appropriate position in a direction followed by the light having passed through the first attachment surface and the photodetector is slid on the third attachment surface to have an appropriately adjusted position in a plane perpendicular to a direction followed by the light having passed through the first attachment surface.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The present invention in an embodiment will now be described with reference to the drawings.

Figure 1:
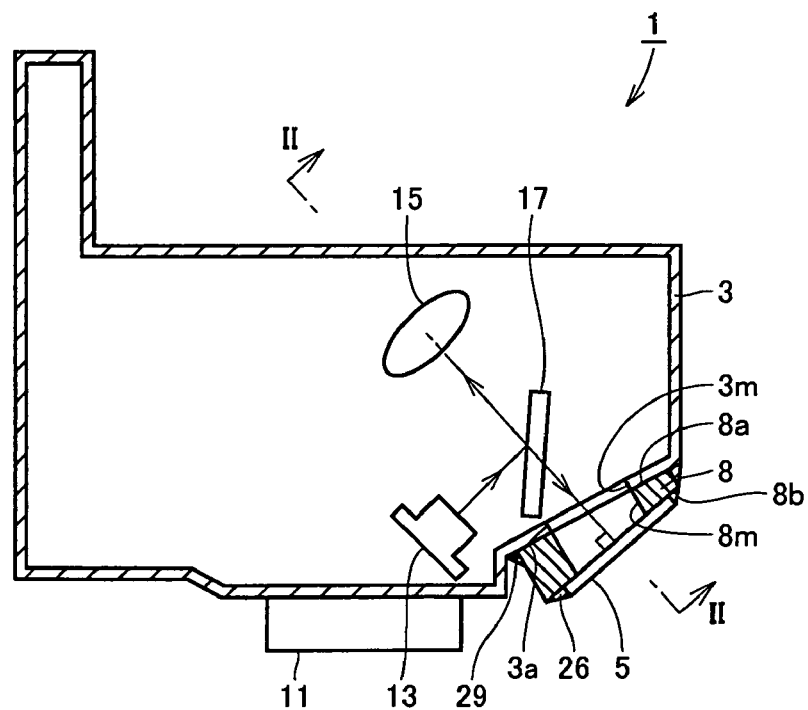
FIG. 1 is a cross section of an optical head device of the present invention in an embodiment.

With reference to FIG. 1, an optical head device 1 includes a base member 3 in the form of a box, a laser diode 13, a half mirror 17 and a mirror 15 arranged internal to base member 3, a block 8 in the form of a wedge arranged on an attachment surface 3a located at an outer perimeter of base member 3, and a photodetector (PDIC) 5 arranged on block 8 at an attachment surface 8b. Block 8 has an attachment surface 8a opposite attachment surface 8b. Block 8 is arranged on base member 3 with attachment surface 8a in contact with attachment surface 3a.

Base member 3 and block 8 are both formed of aluminum. Alternatively, base member 3 and block 8 may be formed of plastic. If plastic is used, optical head device 1 can be reduced in weight and also produced at a reduced cost.

Half mirror 17, mirror 15 and photodetector 5 are arranged on a straight line. On another straight line traversing half mirror 17 perpendicular to the straight line formed by half mirror 17, mirror 15 and photodetector 5 is arranged laser diode 13 spaced from half mirror 17. Half mirror 17 is a semi-transparent mirror transmitting 50% of incident light and reflecting the remaining 50% of the incident light. Apart from attachment surface 3a, base member 3 has a sidewall on which a relay substrate 11 is arranged. From photodetector 5 a wire extends and is connected to relay substrate 11 and further to a control substrate (not shown).

On the straight line formed by half mirror 17, mirror 15 and photodetector 5, the base member 3 attachment surface 3a and block 8 have holes 3m and 8m, respectively. Block 8 is fixed by a UV cure adhesive 29 on base member 3 at attachment surface 3a. Photodetector 5 is fixed by a UV cure adhesive 26 on block 8 at attachment surface 8b. UV cure adhesives 26 and 29 exposed to an ultra violet ray can set in a short period of time of approximately 10 seconds to fix photodetector 5 and block 8. Optical head device 1 can thus be improved in productivity.

Note that while in the present embodiment block 8 and photodetector 5 are fixed with a UV cure adhesive, they may be fixed with solder, an instantaneous adhesive (cyanoacrylate adhesive) or the like. An instantaneous adhesive is more advantageous than a UV cure adhesive in that a device for UV radiation can be dispensed with and optical head device 1 can be fabricated by a simplified apparatus.

Furthermore, if base member 3 and block 8 are formed of plastic, the plastic can be welded on attachment surfaces 3a and 8b to fix block 8 and photodetector 5 on surfaces 3a and 8b, respectively.

Figure 2:
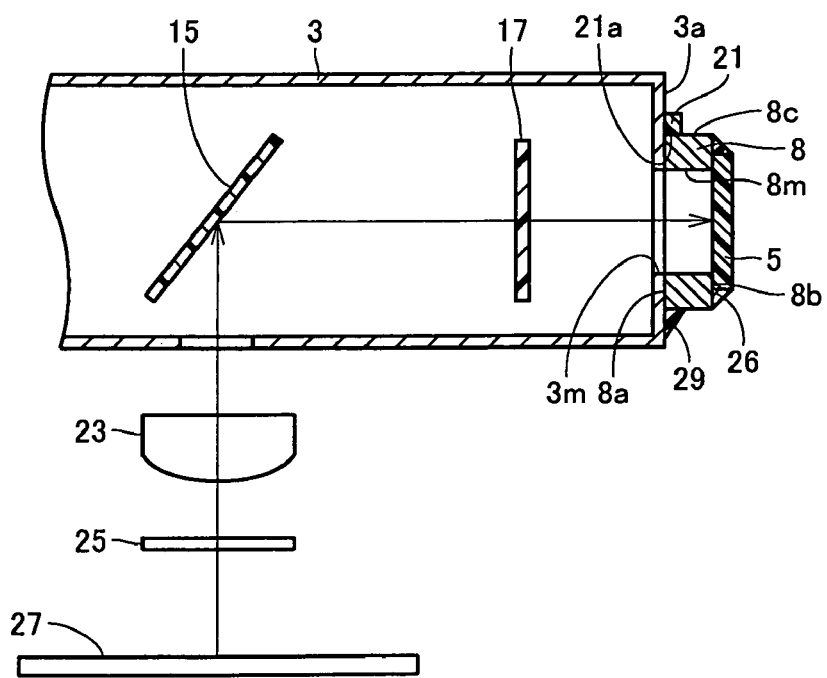
FIG. 2 is a cross section of the FIG. 1 device taken along a line II-II.

With reference to FIG. 2, external to base member 3 on its bottom surface's side are arranged a collimator lens 23 arranged close to base member 3, an objective lens 25 arranged farther away from base member 3 than collimator lens 23 is, and an optical disk 27 arranged farther away from base member 3 than objective lens 25 is. Mirror 15, collimator lens 23, objective lens 25 and optical disk 27 are arranged on a straight line. This straight line perpendicularly traverses the straight line formed by half mirror 17, mirror 15 and photodetector 5.

With reference to FIGS. 1 and 2, laser diode 13 outputs two types of laser beams of light different in wavelength. The laser beam of light having one wavelength is used to read information recorded on a CD and record information on a CD. The laser beam of light having the other wavelength is used to read information recorded on a DVD and record information on a DVD.

Laser diode 13 outputs a laser beam of light which in turn proceeds toward half mirror 17. Half mirror 17, arranged to incline relative to the optical axis, changes the laser beam's path by 90°. Subsequently, the path is changed by mirror 15, arranged to incline relative to the optical axis, again by 90° and proceeds toward collimator lens 23 and objective lens 25 arranged external to base member 3. As it passes through collimator lens 23, the laser beam is converted to collimated light, and passes through objective lens 25 and collects on a surface of optical disk 27.

The laser beam is reflected by optical disk 27 and passes through objective lens 25, collimator lens 23 and mirror 15 toward half mirror 17. Half mirror 17 transmits the laser beam which in turn passes through the base member 3 hole 3m and the block 8 hole 8m, and collects on photodetector 5 at a light receptive portion.

As laser diode 13 outputs two types of laser beams different in wavelengths, photodetector 5 is adapted to receive the two laser beams separately at a light receptive portion arranged at two locations spaced for example by 0.1 mm.

Figure 3:
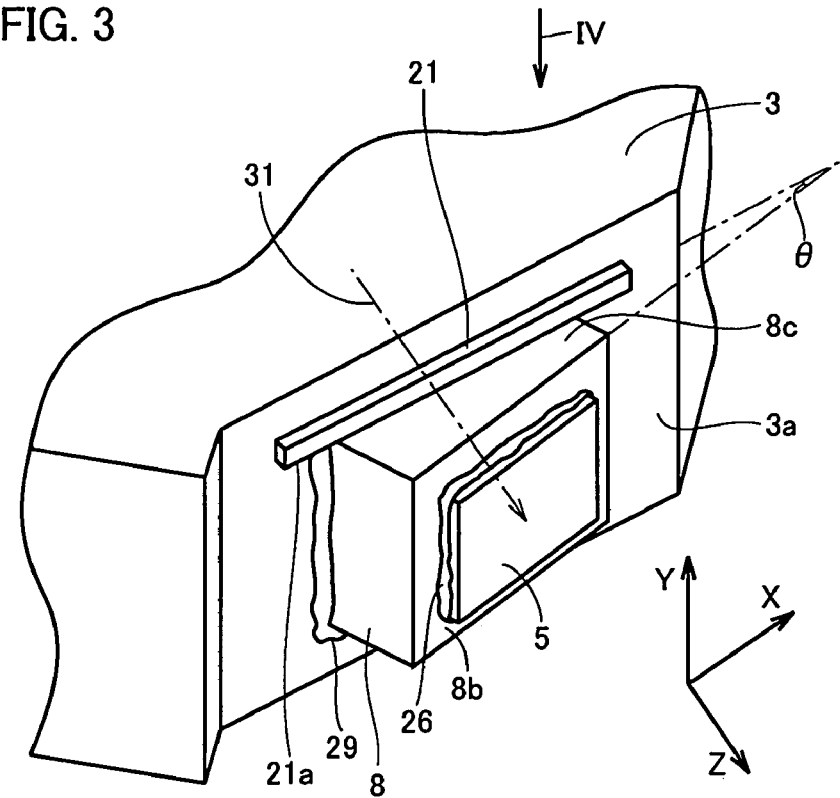
FIG. 3 is a perspective view of a block in the form of a wedge and a photodetector shown in FIG. 1.

With reference to FIG. 3, photodetector 5 is mounted on base member 3 with block 8 posed therebetween. Block 8 has attachment surface 8b inclined relative to the base member 3 attachment surface 3a (the block 8 attachment surface 8a). In other words, attachment surface 3a is spaced from attachment surface 8b by a distance monotonously increasing as seen from the block 8 one end toward the other end. Attachment surfaces 8b and 3a as virtually extended form an angle θ of no less than 5° and no more than 30°.

Figure 4:
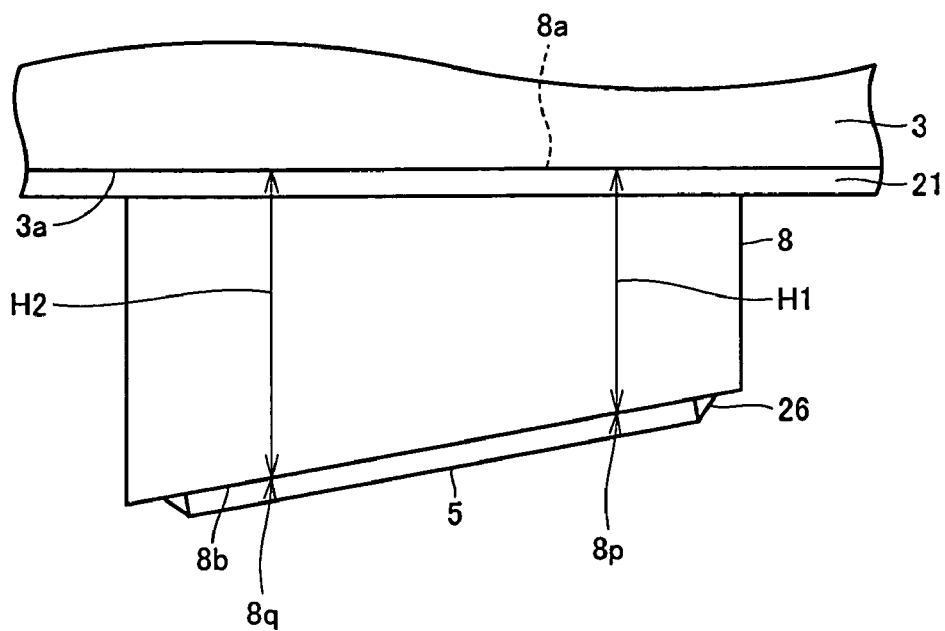
FIG. 4 is a plan view of the block in the form of the wedge and the photodetector as seen in a direction indicated in FIG. 3 by an arrow IV.
Figure 5:
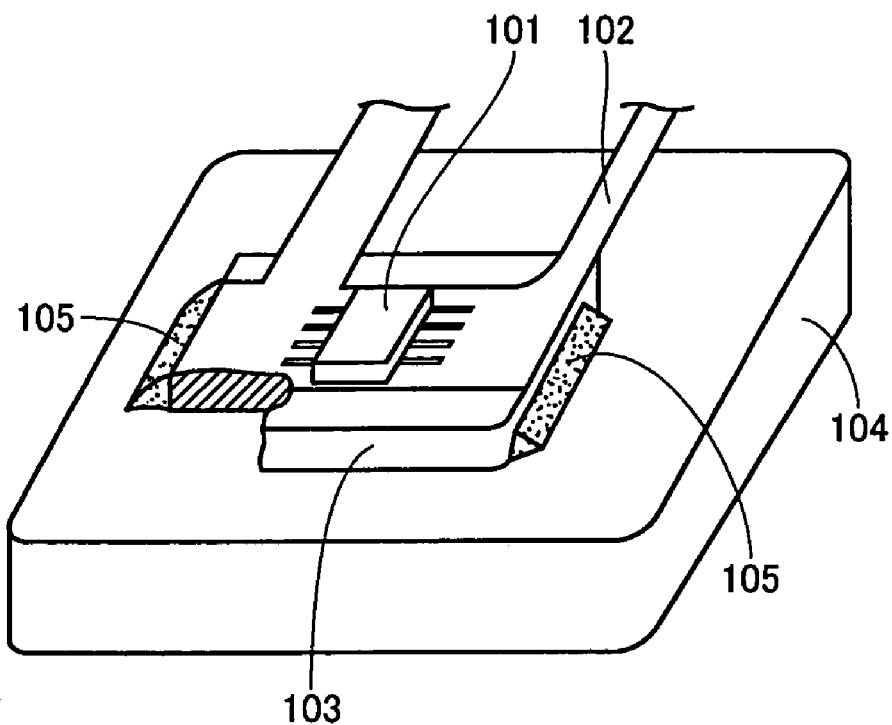
FIG. 5 is a perspective view of an optical pickup device disclosed in Japanese Patent Laying-Open No. 2-301028.
Figure 6:
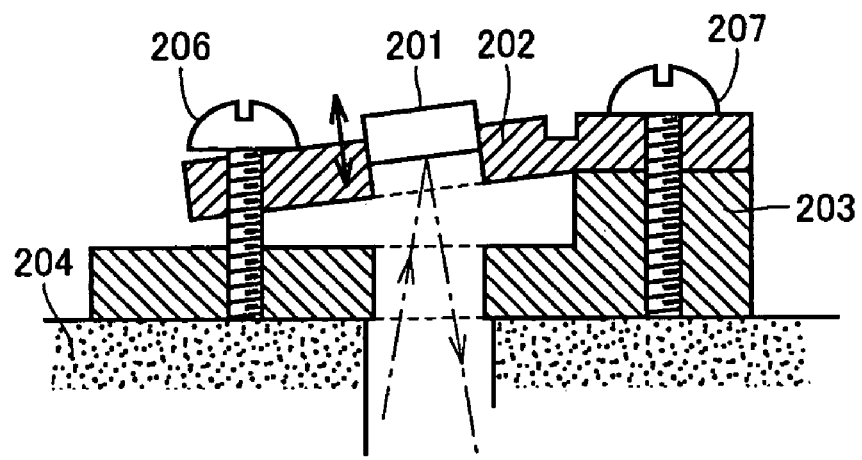
FIG. 6 is a cross section of another optical pickup device disclosed in Japanese Patent Laying-Open No. 2-301028.

With reference to FIG. 4, base member 3 has attachment surface 3a with block 8 arranged thereon and block 8 has attachment surface 8b with photodetector 5 arranged thereon. Attachment surface 8b has a portion 8p having a distance H1 to attachment surface 3a and a portion 8q having a distance H2 to attachment surface 3a. Distance H2 is larger than distance H1.

Block 8 is formed of aluminum. Furthermore, block 8 is a quadrangular prism trapezoidal in cross section and does not have a surface for example notched. As such, block 8 has sufficient rigidity and if portions 8p and 8q receive a force exerted toward attachment surface 8a distances H1 and H2 are invariably maintained.

With reference to FIGS. 1-3, the block 8 attachment surface 8b extends in a direction perpendicular to a direction followed by a laser beam reflected by optical disk 27, as indicated in FIG. 3 by an arrow 31. The laser beam reflected by optical disk 27 is incident perpendicularly on the light receptive portion of photodecor 5 arranged on attachment surface 8b. Thus in photodetector 5 information from optical disk 27 can for example be read more reliably.

With reference to FIGS. 2 and 3, the base member 3 at attachment surface 3a has a guide member 21 arranged thereon and having a guide surface 21a. Guide surface 21a is perpendicularly contiguous to attachment surface 3a and extends in that direction along block 8 from one to the other ends in which attachment surfaces 3a and 8a have therebetween a distance increasing monotonously. Block 8 is arranged to have a sidewall 8c in contact with guide surface 21a. Guide surface 21a extends over a distance greater than sidewall 8c.

The present invention in an embodiment provides optical head device 1 including: base member 3 having attachment surface 3a serving as a first attachment surface passing a laser beam of light reflected by optical disk 27 serving as an optical recording medium; block 8 in the form of a wedge serving as a support member having attachment surface 8a serving as a second attachment surface adjacent to attachment surface 3a and attachment surface 8b opposite attachment surface 8a serving as a third attachment surface; and photodetector 5 arranged on attachment surface 8b to receive a laser beam of light passing through attachment surface 3a. Attachment surface 8b has portion 8p serving as a first portion having the first distance H1 to attachment surface 3a and portion 8q serving as a second portion having the second distance H2 to attachment surface 3a. Distance H2 is greater than distance H1. Block 8 is structured to allow distances H1 and H2 to be substantially invariably maintained when portions 8p and 8q receive a force exerted toward attachment surface 8a.

Optical head device 1 further includes adhesive 29 serving as a first adhesive member fixing block 8 on attachment surface 3a at a desired position and adhesive 26 serving as a second adhesive member fixing photodetector 5 on attachment surface 8b at a desired position. Adhesive 26 and 29 are a UV cure adhesive.

Attachment surface 8b extends in a direction substantially perpendicular to a direction followed by a laser beam of light passing through attachment surface 3a. Optical head device 1 also includes guide member 21 arranged on attachment surface 3a and having guide surface 21a extending in a direction extending from portion 8p toward portion 8q.

Attachment surface 8b inclines relative to attachment surface 3a to and forms an angle of no less than 5° and no more than 30° relative to attachment surface 3a.

A laser beam of light reflected by optical disk 27 and transmitted through half mirror 17 must illuminate photodetector 5 such that the beam is focused on the photodetector's light receptive portion. In particular for optical head device 1 laser diode 13 outputs two types of laser beams of light different in wavelength and the laser beams must illuminate photodetector 5 properly at the spaced light receptive portions. Accordingly in fabricating optical head device 1 photodetector 5 needs to be adjusted in position, as will be described hereinafter.

With reference to FIG. 3, attachment surface 8b is located in a plane X-Y and the direction perpendicular to attachment surface 8b (the direction indicated by arrow 31 followed by a laser beam of light proceeding toward photodetector 5) is represented by an axis Z. Initially block 8 is temporarily fixed on base member 3 at attachment surface 3a and photodetector 5 is moved on attachment surface 8b. Photodetector 5 is positionally adjusted in plane X-Y to allow a laser beam of light to illuminate photodetector 5 at the light receptive portion. More specifically, photodetector 5 is rotated on attachment surface 8b and thus positionally adjusted to allow each laser beam of a different wavelength to illuminate photodetector 5 at a respective, prescribed light receptive portion.

Photodetector 5 positionally adjusted in plane X-Y is temporarily fixed on attachment surface 8b and block 8 is moved on the base member at attachment surface 3a. Photodetector 5 is positionally adjusted in the direction of axis Z to allow a laser beam of light to be focused on photodetector 5 at the light receptive portion. In doing so, block 8 is slid with its sidewall 8c along guide member 21 on guide surface 21a. Block 8 moved along guide member 21 can be moved more smoothly to an optimum position.

As block 8 is moved on attachment surface 3a, photodetector 5 is positionally offset in plane X-Y. Accordingly, photodetector 5 is moved on attachment surface 8b and thus positionally adjusted to again allow a laser beam of light to illuminate photodetector 5 at the light receptive portion.

Attachment surfaces 3a and 8b are flat planes and thus allow photodetector 5 and block 8 to be moved thereon stably. Furthermore, a stage that allows positional adjustment in micrometers can also be used to move photodetector 5 and block 8. Thus photodetector 5 can positionally be adjusted readily and precisely.

By the above described adjustment, photodetector 5 is optimally positioned to allow the light receptive portion to receive a laser beam of light. Block 8 and photodetector 5 thus positioned are fixed by adhesive 29 and 26 applied at a boundary of a sidewall of block 8 and attachment surface 3a and a boundary of a sidewall of photodetector 5 and attachment surface 8b. Adhesive 29 and 26 are exposed to an ultra violet ray and thus cured.

In optical head device 1 of the present invention in an embodiment block 8 in the form of a wedge is slid on attachment surface 3a to positionally adjust photodetector 5 to have an appropriate position in a direction followed by a laser beam of light passing through attachment surface 3a and photodetector 5 is slid on attachment surface 8b to have an appropriate, adjusted position in a plane perpendicular to a direction followed by a laser beam of light passing through attachment surface 3a.

Optical head device 1 thus configured can include photodetector 5 with block 8 in the form of a wedge interposed to allow photodetector 5 to be positionally adjusted readily and precisely. Furthermore, adhesive 26 and 29 used to fix photodetector 5 and block 8 allow photodetector 5 and block 8 to be fixed on attachment surfaces 8b and 3a at positionally adjusted, desired locations.

Furthermore between the base member 3 attachment surface 3a and the block 8 attachment surface 8a and between the block 8 attachment surface 8b and photodetector 5 there does not exist an adhesive contracting as it sets and expanding or contracting after it sets as its environment thermally varies. This ensures that the position of photodetector 5 can be maintained. Furthermore, block 8 that has sufficient rigidity further ensures that the position of photodetector 5 can be maintained. Thus optical head device 1 can be achieved that is highly reliable allowing a laser beam of light to be received steadily by photodetector 5.

Furthermore, attachment surfaces 8b and 3a form an angle θ of no less than 5° and no more than 30°. Forming block 8 in the form of a wedge to provide angle θ as above allows photodetector 5 to be positionally adjusted readily and precisely and attachment surface 3a to be reduced in area in designing base member 3. More specifically, as angle θ is no less than 5°, in positionally adjusting photodetector 5 block 8 can be moved on attachment surface 3a by a reduced distance. This allows attachment surface 3a to be reduced in area in configuring base member 3 to miniaturize optical head device 1. Furthermore, as angle θ is no more than 30°, block 8 can be moved over a long distance to positionally adjust photodetector 5.

For example if attachment surfaces 8b and 3a form an angle θ of 10°, then to positionally correct photodetector 5 offset in the direction of axis Z by one millimeter block 8 is moved on attachment surface 3a by approximately 5.5 mm. Thus, block 8 can be moved on attachment surface 3a without a highly precise positioning operation and photodetector 5 can still be positionally adjusted readily and precisely.

Thus in accordance with the present invention a highly reliable optical head device can be provided that can readily and precisely adjust a photodetector's position and also prevent the positionally adjusted photodetector from positionally being displaced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical head device comprising:
   a base member including a first attachment surface passing light reflected by an optical recording medium;
   a support member including:
      a second attachment surface adjacent to said first attachment surface; and
      a third attachment surface opposite said second attachment surface, having a first portion having a first distance to said first attachment surface and a second portion having a second distance to said first attachment surface greater than said first distance, and extending in a direction substantially perpendicular to a direction followed by the light having passed through said first attachment surface;
   a guide member arranged on said first attachment surface and having a guide surface extending along from said first portion toward said second portion;
   a first adhesive member fixing said support member on said first attachment surface at a desired position;
   a photodetector arranged on said third attachment surface to receive the light having passed through said first attachment surface; and a second adhesive member fixing said photodetector on said third attachment surface at a desired position.

2. The optical head device of claim 1, wherein said support member is slid on said first attachment surface to positionally adjust said photodetector to have an appropriate position in a direction followed by the light having passed through said first attachment surface and said photodetector is slid on said third attachment surface to have an appropriately adjusted position in a plane perpendicular to a direction followed by the light having passed through said first attachment surface.

3. An optical head device comprising:
   a base member including a first attachment surface passing light reflected by an optical recording medium;
   a support member including:
      a second attachment surface adjacent to said first attachment surface; and
      a third linear attachment surface opposite said second attachment surface comprising a first portion having a first distance to said first attachment surface and a second portion having a second distance to said first attachment surface greater than said first distance; and
   a photodetector arranged on said third attachment surface to receive the light having passed through said first attachment surface,
   said support member being configured to allow said first and second distances to be substantially invariably maintained when said first and second portions receive a force exerted toward said second attachment surface,
   wherein the support member has a trapezoidal cross section.

4. The optical head device of claim 3, further comprising a first adhesive member fixing said support member on said first attachment surface at a desired position and a second adhesive member fixing said photodetector on said third attachment surface at a desired position.

5. The optical head device of claim 4, wherein said first and second adhesive members are an ultra violet cure adhesive.

6. The optical head device of claim 3, wherein said third attachment surface extends in a direction substantially perpendicular to a direction followed by the light having passed through said first attachment surface.

7. The optical head device of claim 6, further comprising a guide member arranged on said first attachment surface and having a guide surface extending in a direction along from said first portion toward said second portion.

8. The optical head device of claim 3, wherein said third attachment surface inclines relative to said first attachment surface and forms an angle of no less than 5° and no more than 30° relative to said first attachment surface.

9. The optical head device of claim 3, wherein said support member is slid on said first attachment surface to positionally adjust said photodetector to have an appropriate position in a direction followed by the light having passed through said first attachment surface and said photodetector is slid on said third attachment surface to have an appropriately adjusted position in a plane perpendicular to a direction followed by the light having passed through said first attachment surface.

10. The optical head device of claim 3, wherein the first attachment surface and the third attachment surface have a constant angle therebetween.

* * * * *